(12) United States Patent
Dokania et al.

(10) Patent No.: US 9,468,038 B2
(45) Date of Patent: Oct. 11, 2016

(54) METHODS AND APPARATUS FOR EVENT DETECTION, PROPAGATION AND LOCALIZATION USING UWB IMPULSE RADIOS

(75) Inventors: Rajeev K. Dokania, Ithaca, NY (US); Xiao Y. Wang, Ithaca, NY (US); Carlos I. Dorta-Quinones, Ithaca, NY (US); Waclaw Godycki, Ithaca, NY (US); Alyssa B. Apsel, Ithaca, NY (US)

(73) Assignee: Cornell University, Ithaca, NY (US)

( * ) Notice: Subject to any disclaimer, the term of this patent is extended or adjusted under 35 U.S.C. 154(b) by 174 days.

(21) Appl. No.: 13/695,340

(22) PCT Filed: May 2, 2011

(86) PCT No.: PCT/US2011/034765
§ 371 (c)(1),
(2), (4) Date: Mar. 1, 2013

(87) PCT Pub. No.: WO2011/137426
PCT Pub. Date: Nov. 3, 2011

(65) Prior Publication Data
US 2013/0155904 A1 Jun. 20, 2013

Related U.S. Application Data (60) Provisional application No. 61/329,599, filed on Apr. 30, 2010.

(51) Int. Cl.
H04W 84/18 (2009.01)
H04B 1/7183 (2011.01)
H04W 4/00 (2009.01)
H04W 4/02 (2009.01)
H04W 40/12 (2009.01)

(52) U.S. Cl.
CPC ........... *H04W 84/18* (2013.01); *H04B 1/7183* (2013.01); *H04W 4/00* (2013.01); *H04W 4/006* (2013.01); *H04W 4/02* (2013.01); *H04W 40/125* (2013.01)

(58) Field of Classification Search
None
See application file for complete search history.

(56) References Cited

U.S. PATENT DOCUMENTS

| | | | |
|---|---|---|---|
| 8,140,261 B2 * | 3/2012 | Baryshnikov | 702/5 |
| 8,760,995 B1 * | 6/2014 | Gautam et al. | 370/216 |
| 8,818,701 B2 * | 8/2014 | Baryshnikov | 701/300 |
| 2002/0072329 A1 * | 6/2002 | Bandeira et al. | 455/7 |
| 2005/0078672 A1 * | 4/2005 | Caliskan et al. | 370/389 |
| 2005/0271057 A1 | 12/2005 | Kim et al. | |
| 2006/0176169 A1 | 8/2006 | Doolin et al. | |

(Continued)

OTHER PUBLICATIONS

International Preliminary Report on Patentability dated Nov. 6, 2012 for International Appl. No. PCT/US2011/034765.

(Continued)

*Primary Examiner* — Donald Mills
(74) *Attorney, Agent, or Firm* — Burns & Levinson LLP; Orlando Lopez (57) ABSTRACT

A distributed wireless sensor network includes two or more wireless nodes adapted for sensing a condition at any first node, first programming located within each node for transmitting a signal representing the sensed condition from the first node to another node, second programming located within each node for receiving the signal transmitted from any other node and for retransmitting a received signal representing the sensed condition along with additional data indicating the number of retransmissions of the signal between nodes.

19 Claims, 7 Drawing Sheets

(56) References Cited

U.S. PATENT DOCUMENTS

| | | |
|---|---|---|
| 2009/0086577 A1 | 4/2009 | Ledeczi et al. |
| 2009/0103456 A1* | 4/2009 | Herrmann et al. ........... 370/254 |
| 2009/0141667 A1 | 6/2009 | Jin et al. |
| 2009/0207894 A1* | 8/2009 | Nefedov ............. H04W 56/002 375/219 |
| 2009/0296704 A1* | 12/2009 | Kim et al. .................... 370/389 |
| 2010/0190517 A1* | 7/2010 | Wang .................. H04B 1/7163 455/500 |
| 2010/0254311 A1* | 10/2010 | Simeone et al. .............. 370/328 |
| 2011/0158206 A1* | 6/2011 | Shrestha et al. .............. 370/336 |

OTHER PUBLICATIONS

International Search Report dated Dec. 22, 2011 for International Application No. PCT/US11/34765.

Written Opinion dated Dec. 22, 2011 for International Application No. PCT/US11/34765.

* cited by examiner

■ Nodes where event occured
② Hop-count from where the event occured

Fig. 9

| Bin # | Node A 121 | | Node B 122 | | Node C 123 | | Node D 124 | | Node E 125 | | Node F 126 | | Node G 127 | |
|---|---|---|---|---|---|---|---|---|---|---|---|---|---|---|
| #0 | 0 | 1 | 1 | 1 | 1 | X | 1 | 1 | 1 | 1 | 1 | 1 | 1 | 1 |
| #1 | X | X | 1 | 1 | 0 | X | 0 | 1 | 1 | 1 | 1 | 1 | 1 | 1 |
| #2 | X | X | 1 | 0 | X | X | X | 1 | 1 | 0 | 0 | 0 | 0 | 0 |
| #3 | X | X | X | 1 | X | X | X | X | X | 1 | 1 | 0 | 0 | 0 |
| #4 | X | X | X | X | X | X | X | X | X | X | X | 1 | 1 | 0 |
| #5 | X | X | X | X | X | X | X | X | X | X | X | X | X | 1 |
| #6 | X | X | X | X | X | X | X | X | X | X | X | X | X | X |
| #7 | X | X | X | X | X | X | X | X | X | X | X | X | X | X |

Fig. 10

METHODS AND APPARATUS FOR EVENT DETECTION, PROPAGATION AND LOCALIZATION USING UWB IMPULSE RADIOS

CROSS-REFERENCE TO RELATED APPLICATIONS

This application is a U.S. national stage application under 35 U.S.C. 371 of co-pending International Application No. PCT/US11/34765 filed on May 2, 2011 and entitled METHODS AND APPARATUS FOR EVENT DETECTION, PROPAGATION AND LOCALIZATION USING UWB IMPULSE RADIOS, which in turn claims priority to U.S. Provisional Patent Application No. 61/329,599 filed on Apr. 30, 2010, both of which are incorporated by reference herein in their entirety for all purposes.

STATEMENT REGARDING FEDERALLY SPONSORED RESEARCH OR DEVELOPMENT

This invention was made with government support under Contract No, CNS-0834582 awarded by the National Science Foundation and Contract No. W31P4Q-08-1-011 awarded by the U.S. Army Aviation & Missile Command. The government has certain rights in the invention.

FIELD OF THE INVENTION

The present invention generally relates to wireless sensor networks and particularly to the propagation of data through such networks.

BACKGROUND OF THE INVENTION

Ultra-wideband (UWB) Impulse Radio (IR) is evolving as a promising mode of wireless communication for low-power, low data rate radios. As compared to traditional Continuous Wave (CW) radios, communication in IR-UWB is based on temporally short pulses. The short-duration pulses in case of IR-UWB Radio gives one the opportunity to duty-cycle the power hungry RF circuits. This duty-cycling of the RF circuitry requires good synchronization between communicating nodes. There are various ways of synchronizing two nodes with their corresponding architectural limitations which determine the scalability of the network and the power reduction capabilities. One such implementation of interest to us is that based on Pulse-Coupled Oscillators (PCO). One such method is described in U.S. patent application Ser. No. 12/670,682, filed Feb. 22, 2010 and published with document number 2010-0190517.

This kind of system has been proposed for realizing ultra low power, globally synchronized UWB communication networks. In this kind of network, it is not necessary for all the nodes to be directly interconnected. For the network to work, nodes just need to be indirectly connected through other nodes. Thus, this system is scalable and useful for various low power, low data-rate networks such as sensor networks, human body networks etc. This scheme facilitates a global clock for the entire network, even though the nodes are not directly connected and hence can be utilized in conjunction with various types of Media Access Control (MAC) protocols.

One particular type of network application is a sensor network for the detection of particular events such as intrusion, gas leaks, fire, smoke, etc.

In view of the above discussion, it would be beneficial to have a simple method for propagating event detection through a wireless network.

It would further be beneficial to be able to approximate the distance to the event-detecting node from every other node in the network.

It would further be beneficial to have the capability of detecting different types of events and propagate differentiation information as well.

SUMMARY OF THE INVENTION

One embodiment of the present invention provides a distributed wireless sensor network, comprising: two or more wireless nodes adapted for sensing a condition at any first node; first programming located within each node for transmitting a signal representing the sensed condition from the first node to another node; second programming located within each node for receiving the signal transmitted from any other node and for retransmitting a received signal representing the sensed condition along with additional data indicating the number of retransmissions of the signal between nodes.

The number of retransmissions in the additional data may indicate distance from the sensing first node. The network may further comprise two or more nodes including third programming for determining an approximate location of the sensing first node from the additional data.

In the network, two or more wireless nodes may use pulse coupled synchronization having a time-frame repetition period, which time-frame repetition period is divided into a predetermined number of data bins, and further wherein the number of retransmissions is indicated by the selection of data bin for the additional data.

The network signal may indicate a type of condition that is sensed. The nodes may include fifth programming for duty-cycling receiver circuitry when transmission signals are not expected.

The two or more wireless nodes may use pulse coupled synchronization between nodes having a time-frame repetition rate, and the type of sensed condition may be indicated and prioritized by the time-frame repetition rate. The at least one node receiving the signal may include fourth programming for determining the type of sensed condition from the time-frame repetition rate.

The second programming may require sensing of the condition at the another node for retransmitting the signal. The signal may include validity data.

In another embodiment, the present invention provides a method of communication for a distributed wireless sensor network, comprising the steps of: sensing a condition at any first node in a distributed wireless sensor network; transmitting a signal representing the sensed condition from the first node to another node; retransmitting the signal when received from the another node to yet another node along with additional data indicating the number of retransmissions of the signal between nodes; and repeating the step of retransmitting to propagate the signal through the network.

The method may further comprise the step of approximating the distance from the sensing first node from the number of retransmissions in the additional data. The steps of transmitting and retransmitting may identify a type of condition that is sensed.

The steps of transmitting and retransmitting may be performed using a time-frame repetition period between nodes in the network, which time-frame repetition period is divided into a predetermined number of data bins, and the number of retransmissions may be carried in each retransmission by the selection of data bin for the additional data.

The method of claim 14, wherein the steps of transmitting and retransmitting use pulse-coupled synchronization between nodes having a time-frame repetition rate, and further wherein the type of sensed condition controls the time-frame repetition rate.

The type of condition may be prioritized using the time-frame repetition rate. The condition type may be determined from the time-frame repetition rate.

The first instance of retransmitting may be dependent upon sensing the condition at the another node. The method may further comprise receiving the signal and the additional data at a plurality of base nodes and approximating a location of the sensing one node from the additional data.

BRIEF DESCRIPTION OF THE DRAWINGS

The present invention is illustratively shown and described in reference to the accompanying drawings, in which.

DETAILED DESCRIPTION OF THE DRAWINGS

Figures 1A, 1B:
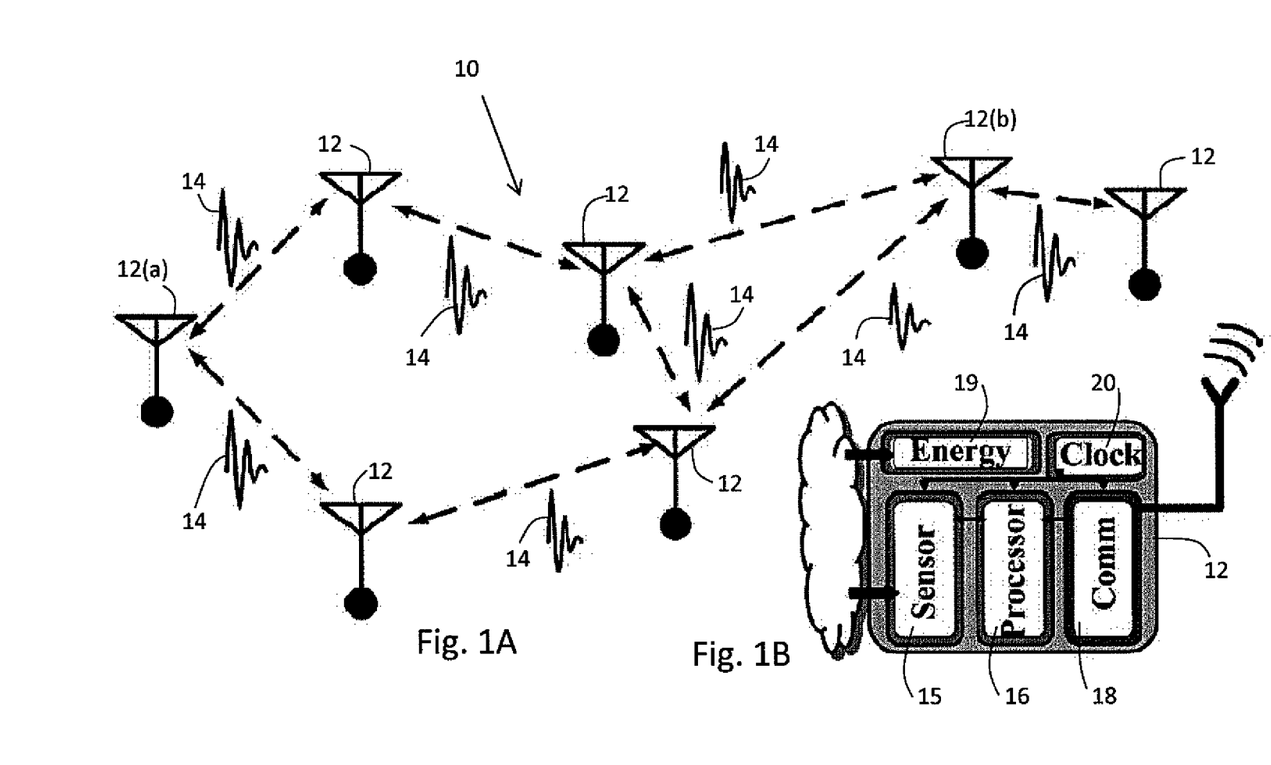
FIG. 1A is a representational diagram of a wireless sensor network comprising independence nodes and constructed according to one embodiment of the present invention.
FIG. 1B is a block diagram of one of the independent nodes 12 of FIG. 1A.

FIG. 1A shows a wireless sensor network 10 constructed in accordance with one embodiment of the present invention. Individual nodes 12 communicate with their nearest neighboring nodes by pulse transmission signals 14. Thus, nodes 12 are all indirectly interconnected. FIG. 1B is a representational block diagram of a sensor node 12, which may include sensor 15 processor 16 and communicator 18, along with a supportive energy source 19 and clock circuit 20. Processor 16 would include programming instructions in any suitable form, for overall control of node 12. Further details of the operation and interaction in a network 10 is described in U.S. patent application Ser. No. 12/670,682, filed Aug. 4, 2008 and published with document number 2010-0190517, which is hereby incorporated by reference in its entirety herein.

Figure 2:
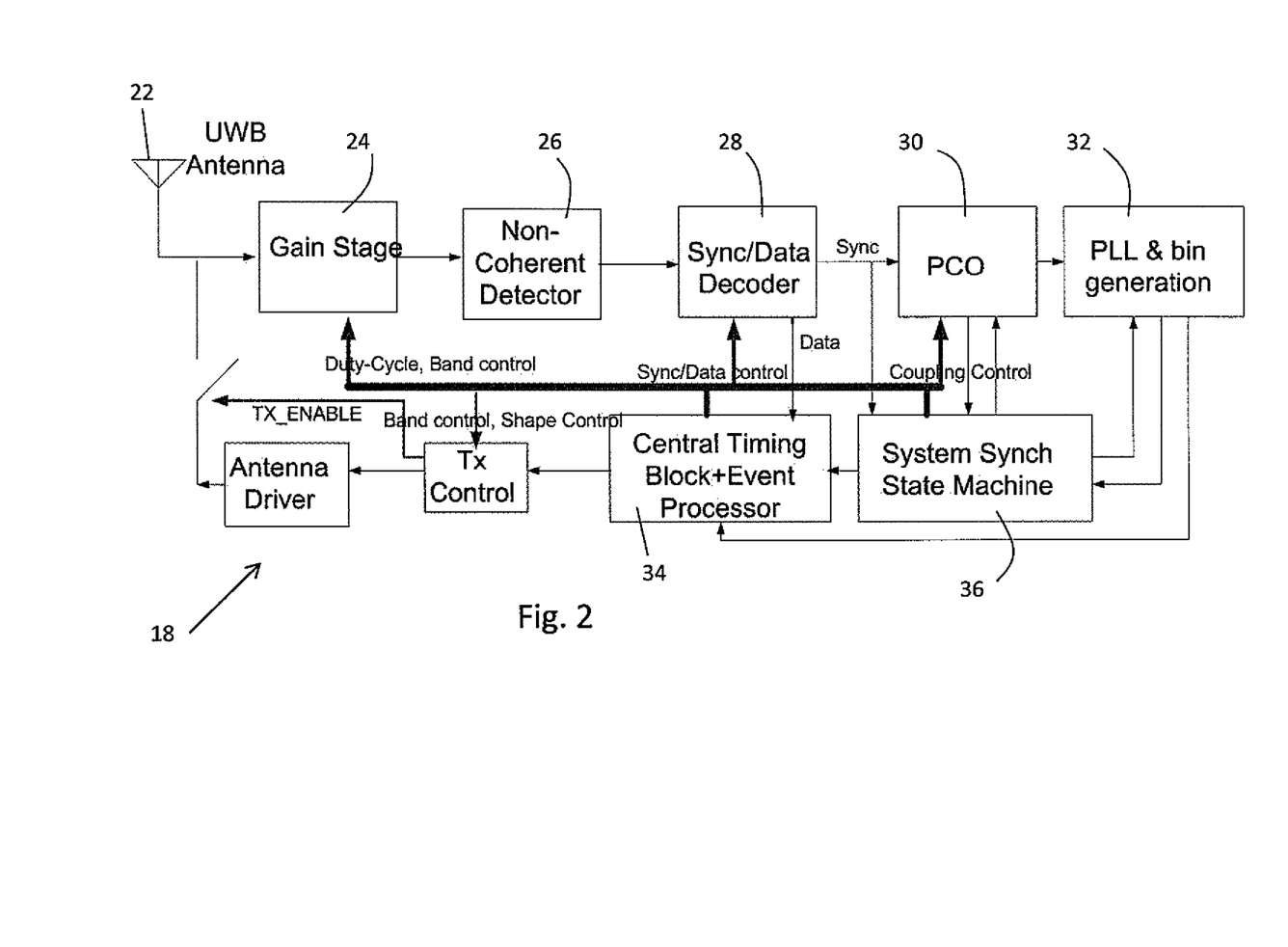
FIG. 2 is a detail block diagram of communication module 18 of FIG. 1B.

FIG. 2 shows greater detail of one possible communication module 18 of FIG. 1B. An antenna 22 feeds a gain stage 24 nominally including a low noise amplifier and amplifying stages. A non-coherent detector 26 detects the reception of pulses, and a sync/data decoder 28 differentiates between synchronization and data pulses. Synchronization pulses are coupled to PCO 30 and the time-frame period of PCO 30 is used by a phase locked loop (PLL) oscillator 32 to generate data bins within the time-frame period of PCO 30. Every time PCO 30 fires, a sync pulse is generated and used to create the timing boundaries (frame-boundary of period $T_{frame}$) for the node 12. The PLL is used to divide the PCO period ($T_{frame}$) to N number of bins ($T_{bin}$). In these bins, the sync pulse is fired in the sync bin, which is aligned with the frame boundary. The bin definitions from PLL oscillator 32 are coupled to a Central Timing Block and Event Processor 34 for use in deciphering received data pulses from Sync/Data Decoder 28. Central Timing Block and Event Processor 34 would contain program instructions in any suitable form (FPGA, programmed microprocessor, etc.) for managing the reception and transmission of data. A System Synch State Machine 36 locally detects and maintains the synchronization to enable data-communication between nodes. Such a sync state machine is described in greater detail in US Patent Application PCT/US09/69195, filed Dec. 22, 2009 and hereby incorporated by reference herein, in its entirety.

The most typical application for the sensors in a sensor network is that of detection of a particular event (e.g. intrusion detection, gas leak, fire, smoke detection, metal detection etc.). In the present application, the inherent synchronization dynamics of PCO nodes are used to facilitate a passive communication of detected events. In one embodiment of the present invention, events sensed locally by a node can be propagated through the network to all nodes in a passive manner, without having to utilize any data transmission. Different events may also be detectable by each node and the type of event may be encoded in the synchronization pulse transmissions between nodes. In another embodiment, propagation through the network includes multiple retransmissions or hops of the sensed event between nodes, which hops can be used to determine the distance to the sensing node from any node in the chain. The distances so determined by two or more nodes may be used to approximate a location for the sensing node. Thus, any of the sensing nodes may be able to determine the type or nature of the detected event and its location. Validation of the detection may also be provided at more than one node before propagation is enabled.

Figure 3:
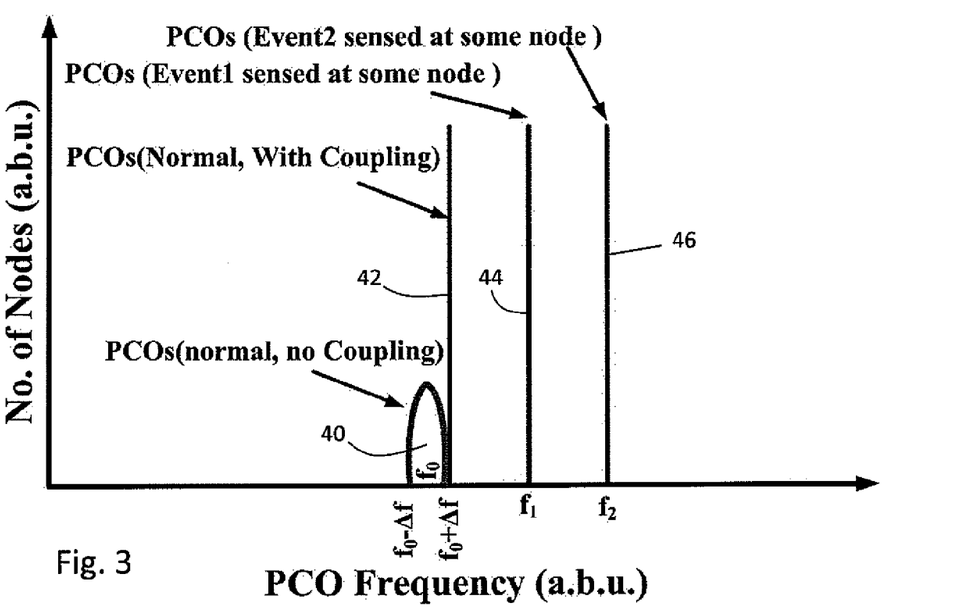
FIG. 3 is a frequency chart for the network of FIG. 1A.

In a PCO network, the fastest node, or node with the highest natural reset frequency, typically sets the frequency for the network by distributing its reset signal sooner than any of the other nodes. FIG. 3 shows a frequency chart for a PCO network constructed in accordance with one embodiment of the present invention. In an idealized configuration for a group of connected nodes, each with a nominal frequency 40 between $f_0+\Delta f$ and $f_0-\Delta f$, the network frequency 42 will be $f_0+\Delta f$. Upon detection of an event, the node that senses the event, will change its frequency to $f_1$ 44 such that $f_1>f_0+\Delta f$. This change for an analog PCO can be done by changing the voltage trip point to a lower value, as described below. Due to this change of rate, the global network frequency becomes $f_1$, which can be locally sensed by all the nodes in the network. Thus, the sensed event is passively communicated throughout the network.

The same method may also be used when sensing different types of events to communicate and prioritize the type of event throughout the network. By using frequency mapping of different types of events, the resultant change in frequency of the network, passively communicates information about the type of the event occurrence to all the nodes, again without using data transmission. For example, an event of type 1 sensed at a node makes to the node set its frequency to $f_1$ 44, while an event of type 2 sensed at a node means frequency transition to $f_2$ 46. The number of different event classifications that can be supported by this mechanism will depend upon the frequency variation tolerance of individual nodes, as well as frequency sensing capability. The priority between different events occurring at various nodes is also provided. Since the network frequency is dictated by the fastest node, a higher priority event mapping to higher frequency can ensure that an event of higher priority will be broadcasted to the nodes in the network in case of two nodes simultaneously sensing different types of events.

This methodology can also be utilized for an external node to probe the status of the network. For an external node to understand the status of network, it can either look at the effective pulse repetition rate in it's neighborhood, or alternatively can join the network as a PCO node with the nominal pulse rate, and then sense it's own pulse rate.

Figure 4:
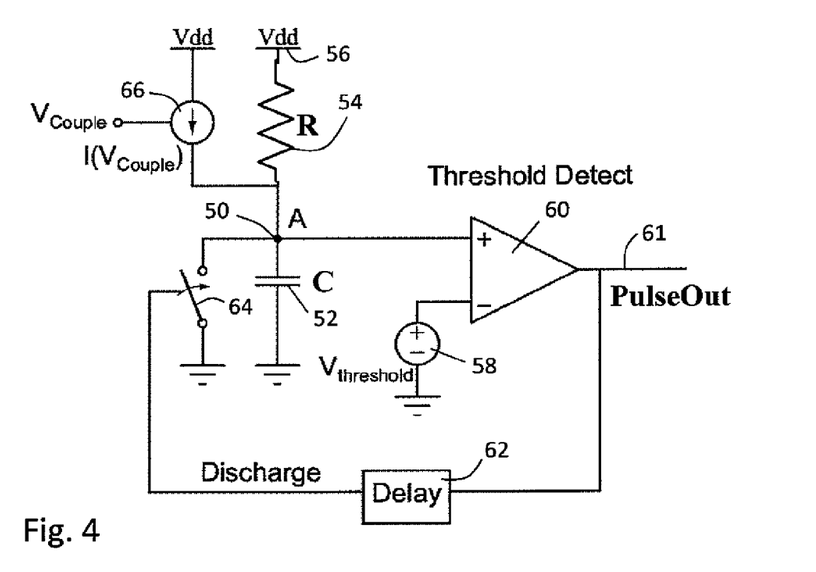
FIG. 4 is a circuit diagram of a pulse coupled oscillator (PCO) that may be used in conjunction with the embodiments of the present invention.

An example of an analog implementation of PCO 30 of FIG. 2 is shown in FIG. 4. The PCO state function is represented by the voltage A at node 50 with respect to time. Node 50, which is the voltage across capacitor 52 is charged up by a current source of resistor 54 and voltage 56. When voltage A exceeds the threshold set by $V_{threshold}$ 58 as determined by comparator 60, the output 61 goes to a positive voltage which is passed through a delay path 62. This causes a switch 64 to discharge voltage A on node 50 rapidly to ground, which switches output 61 back to a negative voltage, thereby generating an output pulse on terminal 61. The output pulse has a width controlled by the delay path 62. As part of the PCO function, synchronizing pulses from other nodes turning on current source 66 for a predetermined pulse width to cause a step voltage change at node 50 for synchronizing nodes.

Figure 5:
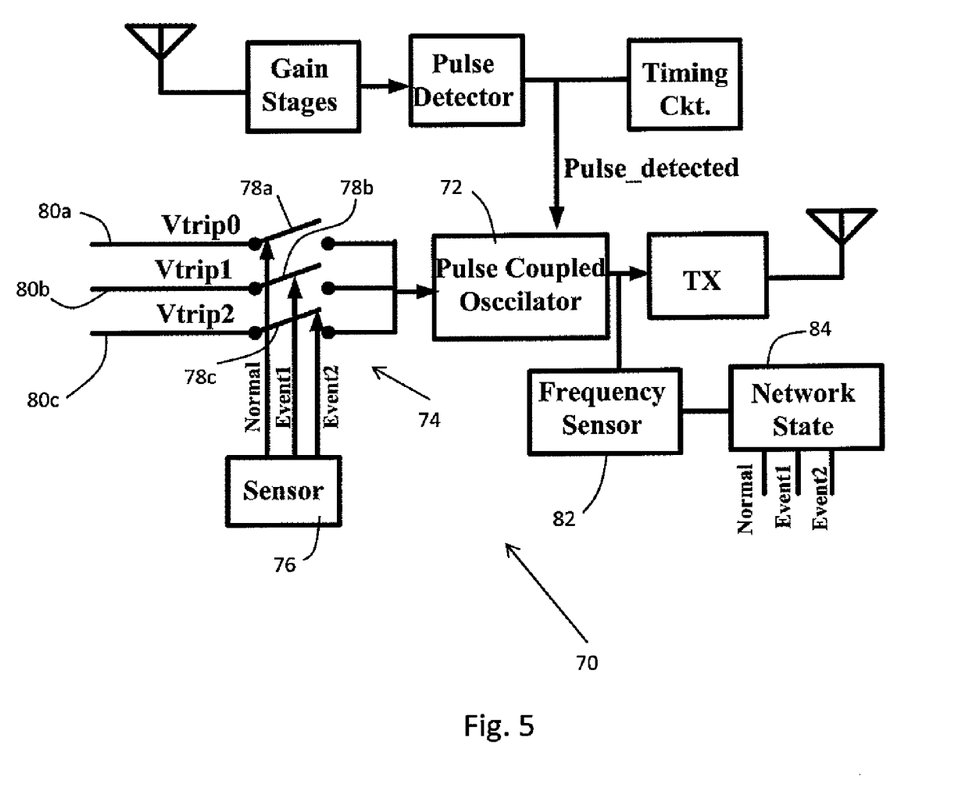
FIG. 5 is a block diagram of a sensor node including another embodiment of the present invention.

From the above description of FIG. 4, it is easily understood how the synchronization period of the oscillator can be changed by varying the threshold voltage 58 of comparator 60. FIG. 5 shows a block diagram of a nominal node 70 having a pulse couple oscillator 72, the threshold voltage for which is controlled by a circuit 74. A multi-event sensor 76 is coupled to a plurality of switches 78a, 78b, 78c for controlling the frame period $T_{frame}$ by coupling different voltages 80a, 80b, 80c to pulse couple oscillator 72. Voltage 80a is the highest voltage producing a normal frame period, while voltage 80b is lower and represents a shorter frame period. Voltage 80c is the lowest voltage having the shortest frame period representing the highest priority event.

Likewise, when the frame period is determined by another node, it will appear at the output of pulse coupled oscillator 72 and be coupled to frequency sensor 82. Thus, the network frame period can be read by a state register 84 to identify the existence and nature of an event sensed at another node.

Depending upon the type of usage, sensor 76 can include a "Time To Live" (TTL) parameter, wherein the node that changed it's frequency to a faster value, can return back to it's normal value after some amount of time. Alternatively, the node can return back to its normal value, only if the sensed event has been cleared.

The aspect of being able to localize event detection in a globalized network like the one described above can be realized by adding data to the event detection propagation. Thus, the globally synchronized network and time domain data bins are used to convey the message about event detection at any node.

Figure 6A:
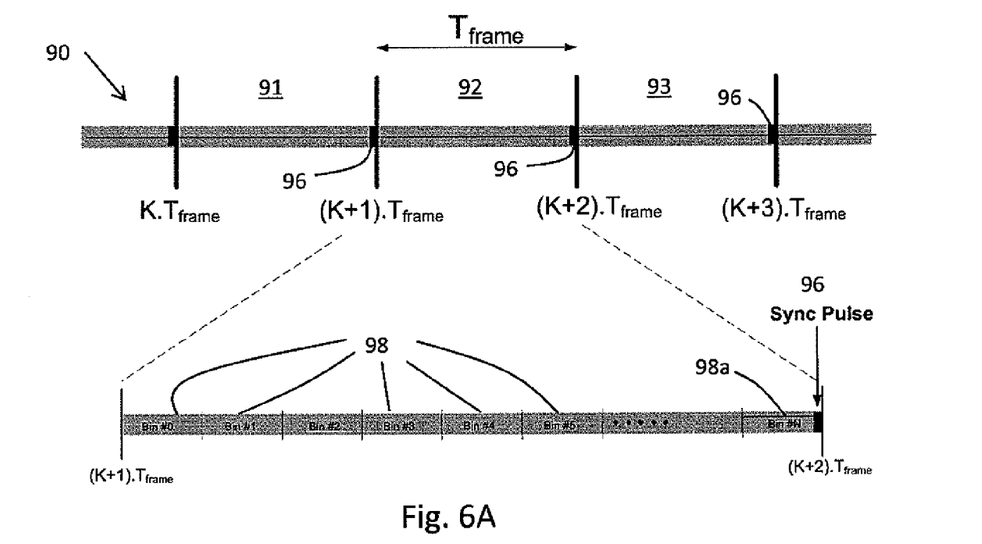
FIG. 6A is a diagram of a PCO time frame broken into a plurality of timing bins.

FIG. 6A shows the concept of frame boundaries and data bins. A sequence 90 of frames 91-93 is shown, which represents three sequential periods between synchronization pulses of a pulse coupled oscillator network. Frame 92 is expanded to show more detailed contents of that frame, which detail applies to the contents of all frames. Every time the PCO fires, a sync pulse 96 is generated, which creates the timing boundaries (frame-boundary of period $T_{frame}$) for the network. The PLL divides the PCO period ($T_{frame}$) to N number of bins 98 ($T_{bin}$). In bins 98, the sync pulse 96 is fired in the sync bin 98a (aligned with the frame boundary).

Figure 6B:
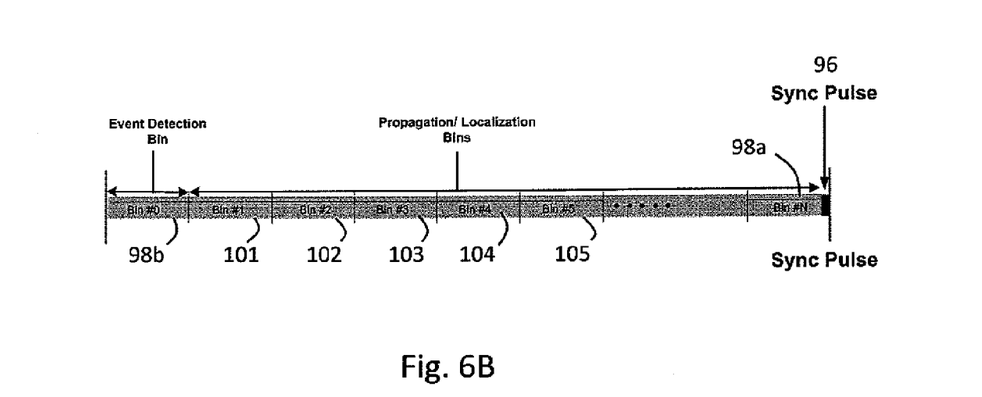
FIG. 6B is a time frame diagram for use in one embodiment of the present invention.

FIG. 6B shows how the other bins 101-105 can be used to convey additional information about the event as well as localization information. In this case, bin 98b is labeled as the Event Detection Bin, while other bins are utilized to convey a hop-count or retransmission total which can be used to determine a distance to the sensing node, or localization information.

The following algorithm when implemented at every node ensures that whenever an event occurs, the other node can know about the hop-count of the node where the event occurred.

1): Every Node listens to the sync bin 98b and to the Event bin 100 (bin#0), and if no "1" is detected, it duty-cycles the receiver and transmitter off.

2): A node where the event happens puts a "1" in the Event bin 100 (bin#0), indicating the event.

3): The node where the event happens also puts a "1" in bin 101, indicating it's own hop-count 4): The closest node in the neighborhood, if finds a "1" in Event bin 100:

looks at each sequential bin for the immediate next bin where a "1" is found;

In the next cycle, it replicates a "1" in bin 98b;

It also puts a "1" after the bin where the first "1" was found other than bin 98b;

Beyond that bin, the node duty-cycles again.

5): The hop-distance for any node in this case will be the data bin# in which they received a "1"

6): After a node has forwarded the event, after sometime, it goes into sleep mode for a duration equivalent to the worst case event reflection in the network. This ensures the network broadcast also dies outward from the point where it was first detected.

Figure 7:
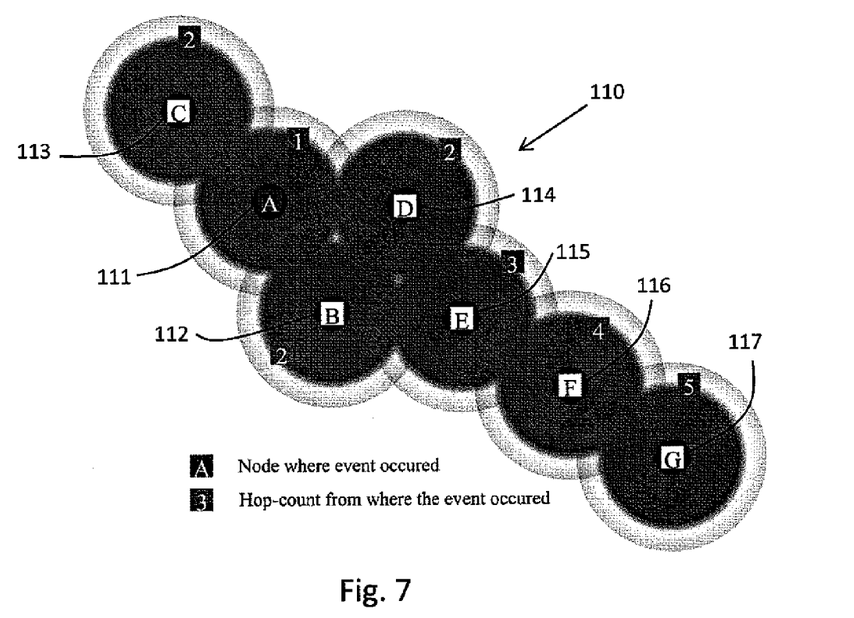
FIG. 7 is a representational diagram of a sensor node distribution of a network constructed according to an embodiment of the present invention.
Figure 8:
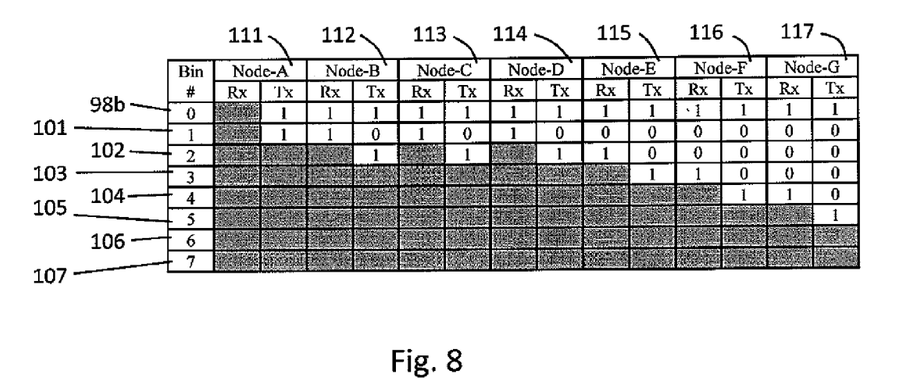
FIG. 8 is a propagation chart of an event detection signal within the network of FIG. 7.

FIG. 7 illustrates a network 110 of nodes 111-117. FIG. 8 shows the propagation of a detected event through the nodes, including the received Rx signal and the transmitted Tx signal for each node 111-117. Dark boxes in FIG. 8 represent duty cycling of the receiver/transmitter r.f. circuitry.

Propagation is explained as follows. Node "A" 111 is the node where an event was detected, it sends (1, 1). In the Node "A's" neighborhood, nodes "B" 112, "C" 113, and "D" 104 all receive (1, 1), thereby knowing that an event occurred and that they are at a hop-count of "2". Since they receive (1, 1), they transmit (1, 0, 1). The node "E" 115 will receive (1, 0, 1), thereby understanding that it is at an hop-count of "3", and then it transmits a (1, 0, 0, 1) as shown in the table in FIG. 8. In this manner, all the nodes in the network can understand about the occurrence of the event as well as the hop-count distance from the event.

In the manner described above, detected events are propagated throughout the network along with additional information that counts the number of hops or retransmissions of the detected events between nodes. Thus, each node receives the information which enables it to estimate the distance from the detecting node using an approximation of the average distance between nodes. In addition, two or more nodes 12(a), 12(b) of FIG. 1A may include addition programming and a communications link for combining their respective hop counts of an event detection to determine a location for the event detecting node.

A refinement of this methodology can also provide a method for localized neighborhood validation, which can help to prevent false-detections. The localized neighborhood validation method proposed in this embodiment requires that an event sensed by a node be validated by at least one of its immediate neighbors. In the absence of neighborhood validation, the event propagation is locally terminated. This prevents against any false-detection, and is good for systems, where information sensed by a node is required to have a local correlation with information sensed by a node in its immediate neighborhood for it to be useful for the whole network.

The algorithm in this case is slightly modified from the algorithm described above. The frame boundary and corresponding bins are the same as shown in FIG. 6B, except that bin#1 101 is used for a verification or validation bit rather than the first hop bit and subsequent bins are shifted accordingly.

The algorithm is as follows:

1): Every Node listens to bin#0 98b, and if no "1" is detected, they duty-cycle the receiver and transmitter off.

2): A node where the event happens, puts a "1" in bin#0 98b, indicating the event and thereby becoming the event-initiator.

3): When a neighboring node receives a "1, 0" in bin#0 98b, bin#1 101, then
  it sends out "1, 1" in the bin#0 98b, bin#1 101 only if it has also sensed the event, thereby verifying the event before sending local correlation of the event, and
  it also sends out a "1" in bin#2 102, the first hop count;
  it drops out, without even replicating anything if it does not also sense the event.

4): Any node in the neighborhood, receiving a "1" in bin#0 98b and a "1" in bin#1 101,
  Then if event was locally sensed too, it just sends "1,1,1" in {bin#0 98b, bin#1 101, bin#2 102}, thereby just sending the previously verified event forward, with a hop-count of "1".
  Without sensing the event itself, the node looks for the next bin in which a "1" is found.
  In the next cycle, it replicates a "1" in bin#0 98b, bin#1 101.
  It also puts a "1" after the bin where the first "1" was found after bin#0 98b and bin#1 101.
  Beyond that bin, the node duty-cycles again.

5): The hop-distance for any node in this case will be the "bin#−1" in which they had to put a "1"

6): After a node has forwarded the event, it goes into sleep mode for a predetermined period equivalent to the worst case event reflection in the network, this ensures the network broadcast also dies outward from the point where it was first detected.

Figure 9:
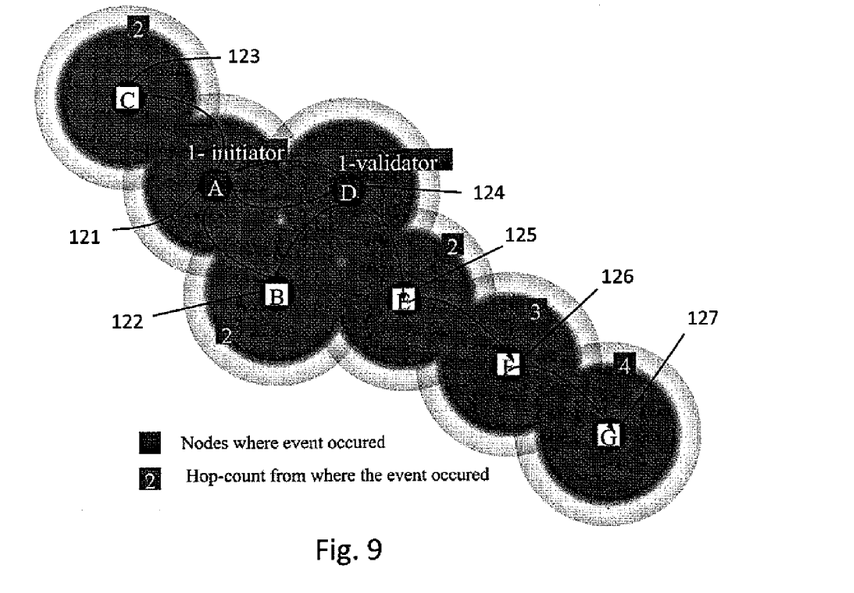
FIG. 9 is a representational diagram of a sensor node distribution of a network constructed according to another embodiment of the present invention.
Figure 10:
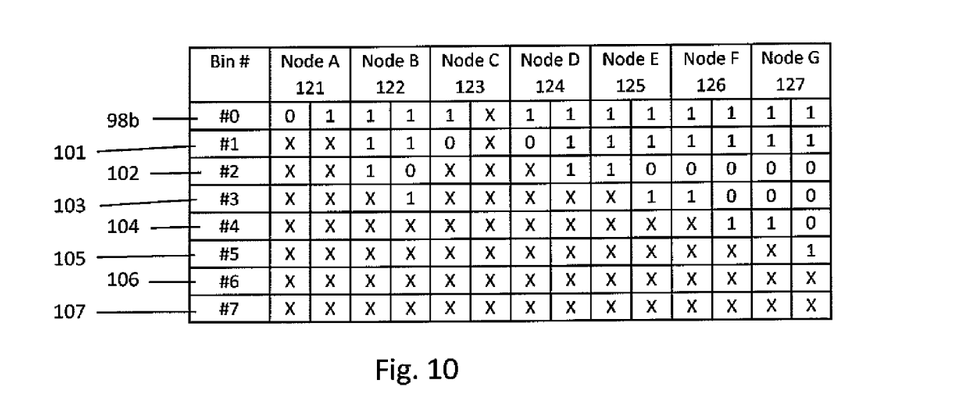
FIG. 10 is a propagation chart of an event detection signal within the network of FIG. 9.

FIG. 9 shows the a network 120 in which the nodes 121-127 are implemented with the verification algorithm described above and in the case of an event detected by two nodes 121 and 124. FIG. 10 is a table demonstrating the propagation of data through the network 120.

Node "A" 121 detects an event in a first PCO frame; it sends a "1" in bin#0 98b.

Nodes "B" 122, "C" 123, and "D" 124 receive the 1 in bin#0 in a second PCO frame.

Nodes "B" 122 and "C"123 do not detect the event and therefore do not transmit any data. Node "B" 122 does not show this PCO frame in FIG. 10.

Node "D" 124 also detects the event in the second PCO frame and transmits a "1" in each of bin#0 98b (an event), bin#1 (verification) 101 and bin#2 (one hop count).

Nodes "E" 125 and "B" 122 receive the data bits in bin#0 98b and bin#1 101 in a third PCO frame and start looking for the next data bin with a bit. When they receive the data bit in bin#2 102, they transmit data bits in bin#0 98b, bin#1 101 and bin#3 103 during the next sequential PCO frame.

Node "F" 126 receives the data bits in bin#0 98b and bin#1 101 and starts looking for the next data bin with a bit. When it receives the data bit in bin#3 103, it transmits data bits in bin#0 98b, bin#1 101 and bin#4 104 during the next sequential PCO frame.

Node "G" 127 receives the data bits in bin#0 98b and bin#1 101 and starts looking for the next data bin with a bit. When it receives the data bit in bin#4 104, it transmits data bits in bin#0 98b, bin#1 101 and bin#5 105 during the next sequential PCO frame.

The bins labeled "X" in FIG. 10 indicate periods when the transmit/receive circuitry is duty-cycled off.

In this methodology, for two nodes detecting the event at the same time, it is preferred to avoid a race-condition for being the event-initiator. This is prevented by having random fall-back, and reinitiating the event-circulation, if the event wasn't validated, as all the node became initiator at the same time. All the node becoming initiator at the same time too is a safe condition, as in that case, it doesn't allow the event information to pass, but then the initiators know that the event hasn't been validated, so they can initiate the event transactions again after random-fallback. Irrespective of which node becomes the initiator in a neighborhood, the event-hop count distance remains the same for any other node, where the event didn't happen.

If an event-initiator finds that its events are not being forwarded most of the time, it may mark it's sensor as faulty, and take corrective healing actions. Alternatively, it can also self-elevate/self-validate the events, depending upon the confidence level it has on the accuracy of the event sensed by it's own sensor.

In a further embodiment, event classification features can be added to the methodologies discussed above. Several bins before the event-localization bins can be reserved for conveying the event-type information. With the event classification, every propagating node has to replicate the message that they see in Event-classification bin in addition to the Event bin & validation bins.

In a still further refinement, the event classification bins recited immediately above, may be used for message classification purposes so that the network can propagate both messages other than event detection as well as event detection.

The present invention is illustratively described above in reference to the disclosed embodiments. Various modifications and changes may be made to the disclosed embodiments by persons skilled in the art without departing from the scope of the present invention as defined in the appended claims.

The invention claimed is:

1. A distributed self-synchronizing, pulse coupled wireless sensor network, comprising:
  more than two self-synchronizing, pulse coupled wireless nodes adapted for sensing a condition at any first node wherein each wireless node includes a pulse coupled oscillator connected to self-synchronize with pulse coupled oscillators in other wireless nodes;

first programming located within each node for transmitting a signal representing the sensed condition from the first node to a second node;

second programming located within each node for receiving the signal transmitted from any first node and retransmitting a received signal to a third node along with additional data indicating the number of retransmissions of the signal between nodes, wherein the more than two wireless nodes use pulse coupled synchronization between pulse coupled oscillators in separate wireless nodes having a synchronization time-frame repetition period, which time-frame repetition period is divided into predetermined number of sequential data bins, and further wherein the number of retransmissions is indicated by the selection of a sequential data bin for a single pulse transmission.

2. The network of claim 1, wherein the number of retransmissions in the additional data indicates distance from the sensing first node.

3. The network of claim 2, further comprising two or more nodes including third programming for determining an approximate location of the sensing first node from the additional data.

4. The network of claim 1, wherein the signal indicates a type of condition that is sensed.

5. The network of claim 4, wherein the two or more wireless nodes use pulse coupled synchronization between pulse coupled oscillators in separate wireless nodes having a synchronization time-frame repetition rate, and further wherein the type of sensed condition is indicated and prioritized by the time-frame repetition rate.

6. The network of claim 5, wherein at least one node receiving the signal includes fourth programming for determining the type of sensed condition from the time-frame repetition rate.

7. The network of claim 1, wherein the second programming requires sensing of the condition at the another node for retransmitting the signal.

8. The network of claim 7, wherein the signal includes validity data.

9. The network of claim 1, wherein the nodes include fifth programming for duty-cycling receiver circuitry when transmission signals are not expected.

10. The network of claim 1, wherein each pulse transmission is a single pulse transmission.

11. A method of communication for a distributed, self-synchronizing, pulse coupled wireless sensor network, comprising the steps of:

synchronizing separate nodes in a distributed, pulse-coupled wireless sensor network using synchronization pulses transmitted between the separate nodes to synchronize a pulse coupled oscillator in each node;

sensing a condition at any first separate node in the sensor network;

transmitting a signal representing the sensed condition from the first separate node to a second separate node;

retransmitting the signal when received at the second separate node to a third separate node along with additional data indicating the number of retransmissions of the signal between nodes; and repeating the step of retransmitting to propagate the signal through the network, wherein the steps of transmitting, retransmitting and repeating are performed using a time-frame repetition period between synchronization pulses, which time-frame repetition period is divided into a predetermined number of sequential data bins, and further wherein the number of retransmissions is carried in each retransmission by the selection of a sequential data bin for a pulse transmission.

12. The method of claim 11, further comprising the step of approximating the distance from the sensing first separate node from the number of retransmissions in the additional data.

13. The method of claim 11, wherein the steps of transmitting and retransmitting identify a type of condition that is sensed.

14. The method of claim 13, wherein the steps of transmitting and retransmitting use a time-frame repetition rate between synchronization pulses, and further wherein the type of sensed condition controls the time-frame repetition rate.

15. The method of claim 14, wherein the type of condition is prioritized using the time-frame repetition rate.

16. The method of claim 15, further comprising determining the condition from the time-frame repetition rate.

17. The method of claim 11, wherein a first instance of retransmitting is dependent upon sensing the condition at the another node.

18. The method of claim 11, further comprising receiving the signal and the additional data at one or more base nodes and approximating a location of the sensing one node from the additional data.

19. The method of claim 11, wherein each pulse transmission is a single pulse transmission.

* * * * *